Patented July 14, 1936

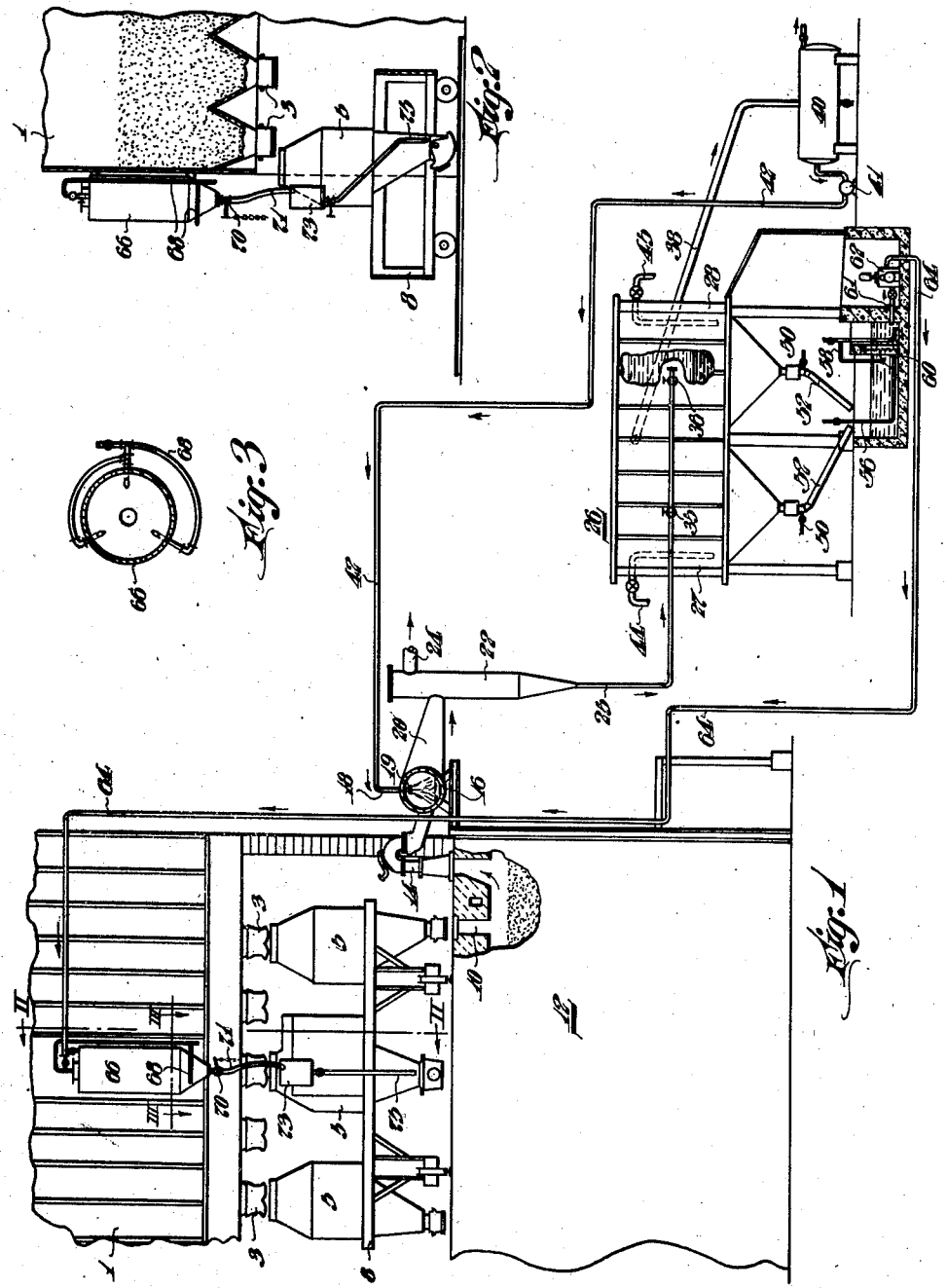

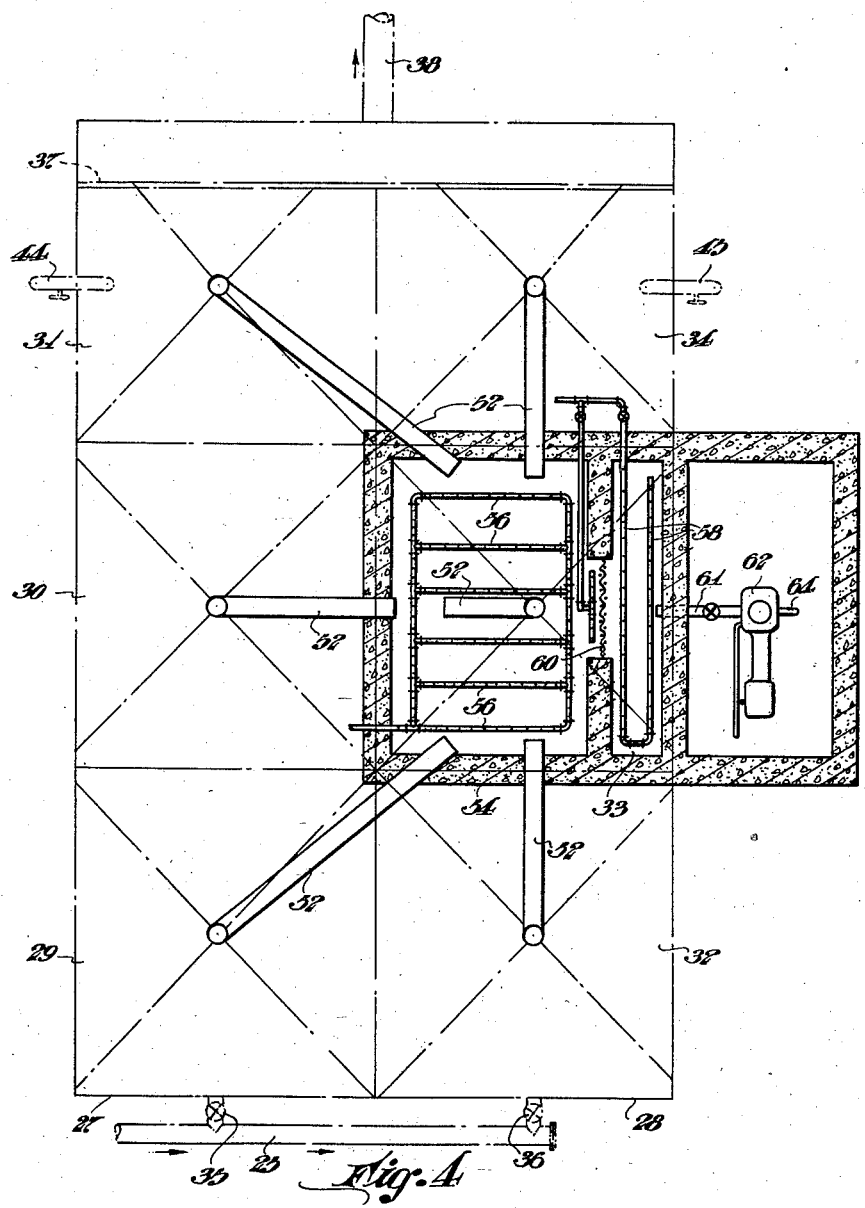

2,047,283

UNITED STATES PATENT OFFICE 2,047,283

SLUDGE HANDLING SYSTEM

Elwood W. Montgomery, New Haven, Conn., assignor to The Koppers Company of Delaware, a corporation of Delaware Application March 10, 1932, Serial No. 597,937

5 Claims. (Cl. 202—33)

My invention relates to the disposal of the tar sludge or muck which accumulates in decanters or hot drain tanks employed for separating tar from flushing liquor in coke oven plants, and for similar purposes.

In the manufacture of fuel gas and coke by carbonizing coal in batteries of coke ovens or retorts, it is general practice to pass the gas generated in the several ovens or retorts through a collecting main or hydraulic main where it is contacted with flushing liquor which cools the gas. The flushing liquor may be sprayed into the gas passing through the main, or passed through the main with the gas, or both.

Its effect is to cause condensation of some of the water and tar contained in the gas, usually with partial condensation of ammonia, especially ammonia in the form of fixed ammonia compounds. The flushing also removes solid particles which may be entrained in the gas or may otherwise enter the flushing system, such as coal dust, coke breeze, pitch, and the like.

The gas is separated from the liquor and continues through the plant for purification and recovery of by-products. The liquor enters a hot drain tank which usually consists of an elongated baffled tank, or a series of tanks, wherein the aqueous portion of the flushing liquor is more or less completely separated from the tar and solids by decantation.

The aqueous liquor is recirculated to the collecting main where it flushes and cools a further quantity of gas. Excess liquor, corresponding roughly in volume to the amount of aqueous condensate, is discharged to the ammonia liquor storage tank from which it is subsequently withdrawn and treated to recover ammonia.

The tar and solids which sink below the aqueous liquor in the hot drain tank undergo a further separation or stratification. The upper layer thus formed consists essentially of tar, sometimes called light tar, which is relatively free from suspended solids and which is decanted or siphoned off for storage, shipment, or other disposal. A layer of heavier sludge accumulates on the bottom of the hot drain tank and must be removed from time to time.

This sludge, which is also sometimes referred to as muck or pitch, frequently contains as much as 50% to 60% solid material consisting chiefly of coke breeze, coal dust, and dirt. These solids are bound together with pitch or heavy tar oil to form a heavy viscous mass which is substantially solid at ordinary temperatures and which is usually regarded as a waste material.

The removal of this sludge from the bottom of the hot drain tank and its subsequent disposal present difficult problems for which various solutions have been proposed. The method which has probably been most commonly employed in the past for this purpose comprises shutting down a section or sections of the hot drain tank, withdrawing the aqueous liquid and tar therefrom, and then manually shoveling out the sludge. Sometimes a crane equipped with a bucket or ladle is substituted for the hand shovellers.

Such methods are dirty and unpleasant, as well as expensive, and involve temporary withdrawal from operation of sections at least of the hot drain tank. The removed sludge must still be disposed of and this is sometimes done by using it as fill, for which purpose its value is substantially the same as that of an equal volume of ordinary dirt, or more commonly by burning it, in which case no value at all is usually obtained.

An object of my present invention is to provide an improved process of removing the sludge or pitch deposited in hot drain tanks and analogous decanting and sludge tanks, and suitable apparatus therefor.

A second object of my invention is to provide an improved process of disposing of sludges of the character described, and suitable apparatus therefor.

Another object of my invention is to provide an improved flushing and decanting system for coke oven plants and the like.

A further object of my invention is to provide an improved process of gas manufacture and treatment.

My invention has for further objects such other operative advantages and results as obtain in the process and apparatus described and claimed herewith.

My invention contemplates removing and disposing of the sludge from hot drain tanks, and other carbonaceous sludges, by an improved process in which the sludge is heated and diluted, preferably with live steam, and pumped to an overhead tank at the battery of ovens or retorts so that the sludge can be mixed with coal charged into the ovens and carbonized simultaneously therewith.

I will now describe my invention with reference to the accompanying drawings in which Figure 1 is an elevational view, with parts broken away, of a preferred arrangement of apparatus for the practice of my invention;

Figs. 2 and 3 are views taken on the lines

II—II and III—III respectively of Fig. 1, showing parts of the apparatus in more detail; and Fig. 4 is a plan view of a preferred type of hot drain tank and auxiliary equipment for the practice of my invention.

Referring now to the drawings, coal which has previously been pulverized to the size preferred for carbonization is withdrawn from storage or mixing bins 1 through chutes or spouts 3 into the hoppers 5 of a larry car 8. The larry car is moved into position over the oven to be charged, and the coal contained in the hoppers is charged through ports 10 into the coke oven or retort 12 which is usually one of the a battery containing any desired number of such retorts or ovens.

The coal in the ovens is heated in known manner by the passage of hot gases through flues in the heating walls surrounding the oven chambers, and is thereby carbonized with an accompanying evolution of gas. This crude gas passes through ascension pipes 14, one or two of which are provided for each oven chamber, into a collecting main or hydraulic main 16 where it is contacted with flushing liquor in any desired manner, as by introducing the liquor through a series of pipes 18 terminating in sprays 19 located at intervals along the main 16.

The gas is cooled by the flushing liquor and tar and water contained in the gas are condensed. The condensate combines with the liquor which also removes some ammonia from the gas. The gas and liquor pass from the main 16 through an offtake 20 into a pitch trap 22, and the gas passes from the upper end of this pitch trap through a pipe 24 for further purification and recovery of by-products.

The flushing liquor and the tar and other constituents removed from the gas continue from the bottom of the pitch trap through a pipe 25 into a hot drain tank 26, which may contain any desired number or arrangement of sections or divisions suitable for decanting aqueous liquor from tar and solids collected therewith.

In the present instance a hot drain tank consisting of six divisions is shown conventionally in Fig. 4 and in elevation at the right hand side of Fig. 1. These divisions are arranged in two parallel series or sections, 27 and 28, containing three divisions each. The divisions in section 27 are numbered 29, 30 and 31, and those in section 28 are numbered 32, 33 and 34.

The two series or sections may be operated simultaneously or alternately, or one series may be omitted, or a different number of divisions may be operated in series if preferred. In any case the results of the operation are similar to those obtained in the operation of sections 27 and/or 28 in the present instance, and this operation may therefore be considered typical of modern practice, although my invention is not specifically limited thereto.

Flushing liquor passing from the pitch trap 22 through pipe 25 enters sections 27 and/or 28 through pipes 35 and 36 respectively, and separates into layers, as previously described. The aqueous liquor remains on top and passes over a baffle conventionally indicated at 37 in Fig. 4 and through pipe 38 to a flushing liquor circulating tank 40, which may in some instances be omitted. This liquor is recirculated by pump 41 through pipe 42 to the pipes 18 and the collecting main 16.

A layer of tar separates below the aqueous layer, and this tar is discharged, preferably from points near the outlet end of the tank in divisions 31 and 34, for example, through siphons or offtakes 44 and 45. These offtakes are preferably adjustable, and tar is discharged therethrough for storage, shipment, or other disposal. In some instances, tar may be recirculated to the collecting main.

A layer of sludge collects in the bottom of each division, the bottoms being preferably tapered or sloped as shown. This sludge consists largely of coal dust, coke breeze, dirt and heavy pitch or tar, as stated hereinabove, and it is nearly solid at ordinary temperatures.

In accordance with my invention, I keep this sludge in a relatively fluid condition by the use of perforated steam coils or jets 50 of live steam discharging into the bottom of each section, and I withdraw the sludge either continuously or intermittently through pipes 52 into a sump or reservoir 54 which is preferably located beneath the hot drain tank 26, at least in part.

The sump 54 is also provided with perforated steam coils 56 and 58 or other suitable means for heating and/or diluting the sludge to keep it in a mobile condition. The sludge passes through a screen 60 to the intake pipe 61 of a pump 62 adapted to handle material of this nature, and which delivers it through a pipe 64 to a sludge storage tank or muck tank 66.

The tank 66 is mounted above the battery of ovens 12 and preferably adjacent to the coal bins 1. It is equipped with heating coils 68 or other suitable heating means, and with an outlet at the bottom controlled by a valve 70. A pipe or flexible hose 71 of suitable length is connected to the valved outlet. The tank 66 may be of any desired size, but it has been found in practice that a tank having a capacity of 500 to 1,000 gallons, such as 750 gallons for example, is convenient for most installations.

A smaller tank 73 is mounted on the larry car 8 in such position that it can readily be filled with sludge or muck from the tank 66 through the conduit 71 while the hoppers 5 are being filled from the bins 1. Tank 73 may have a capacity of about 50 gallons, for example, and is provided with a valved outlet 75, so located that it can discharge sludge through the charging ports 10 into the ovens 12 during or after the charging of coal into the ovens.

Sludge charged to the ovens 12 is mixed with the coal and simultaneously carbonized. It is thereby converted into coke and gas which are salable products, so that a financial return is obtained in connection with my process from what was formerly considered a waste product requiring more or less expensive means of disposal.

Another advantage of my improved process is that if desired it can be made continuous and substantially automatic, at least insofar as the removal of sludge from the hot drain tank is concerned. This is done by permitting a continuous introduction of steam through jets 50 or their equivalent and continuously discharging sludge at a selected rate through pipes 52 to the sump 54.

In some instances it is preferable to withdraw the sludge intermittently, however, allowing intervening periods for its undisturbed accumulation. In any case, it is to be understood that the sludge can be removed in accordance with my invention either with or without shutting down and draining the sections of the tank which are being freed from sludge.

Furthermore, while I have described my process with especial reference to the removal and disposal of sludge from coke oven plant hot drain tanks, for which purpose it has especial utility, it is to be understood that my process is not limited to this particular application. Carbonaceous sludges in general, and other sludges of similar character, such as those forming in other decanting tanks and in tar storage tanks can also be economically disposed of by carbonization, as described hereinabove.

It will be obvious to those skilled in the art that certain modifications can be made in the several steps of my process and the several parts of my apparatus, in addition to those described by way of example hereinabove, without departing from the spirit of my invention, and it is my intention that the claims shall cover all such modifications as are included within the scope thereof.

I claim as my invention:

1. The combination with a coking retort oven having heating means adapted to maintain the oven at coking temperature, coal charging means movable from position to receive a coal charge into position to charge the oven with coal, a collecting main adapted for communication with the oven for passage of hot gases and liquids therethrough, means for passing hot gases through the collecting main, means for introducing a liquid into the collecting main into washing contact with the gas in the collecting main, means connected with the collecting main for withdrawing non-gaseous material from the collecting main; of sludge feeding means mounted for movement in unison with the coal charging means for charging sludge into the oven during coal charging by the coal charging means, a decanting vessel communicating with the withdrawal means to separate the non-gaseous material into layers of aqueous liquor, tar and sludge and having draw-off means for separately withdrawing the aqueous liquor and tar above the bottom of the decanting vessel, of means for introducing steam into the lower part of the decanting vessel to heat the sludge in the vessel to render the sludge mobile, storage means adjacent to said decanting vessel and provided with means for heating material therein, of means for drawing off the sludge while mobile from the bottom of the decanting vessel into said storage means, and means for conveying sludge from the storage means to said sludge feeding means.

2. The combination with apparatus for manufacturing gas by coal carbonization having coal carbonization gas-producing means and movable means movable to position to receive coal from coal storage bins and to position to charge the received coal into the coal carbonization gas-producing means, and with gas treatment apparatus comprising collecting main means communicating with the gas-producing means and having flushing means for collecting and flushing gas from the gas-producing means; of a hot-drain decanter tank communicably connected with said collecting main means to receive the flushing liquor and non-gaseous material removed therewith from the gas, said hot-drain decanter tank having draw-off means for separate off-take of sludge from the bottom and aqueous liquor and tar above the bottom of the decanter tank, of means for heating material contained within the bottom of the decanter tank, storage means adjacent to said hot-drain tank and provided with means for heating material contained therein, a charging tank mounted for movement in unison with the coal charging movable means and having means for charging sludge from the charging tank into the gas-producing means, a reservoir provided with heating means for sludge from the storage means and adapted for charging the sludge into the charging tank, regulable means for controlling the flow of sludge from the sludge draw-off means to the storage means, and pumping means adapted to deliver mobile sludge from the storage means to the reservoir.

3. The combination with apparatus for manufacturing gas by coal carbonization having coal carbonization gas-producing means and movable means movable to position to receive coal from coal storage bins and to position to charge the received coal into the coal carbonization gas-producing means, and with gas treatment apparatus comprising collecting main means communicating with the gas-producing means and having flushing means for collecting and flushing gas from the gas-producing means; of a hot-drain sloping bottom decanter tank communicably connected with said collecting main means to receive the flushing liquor and non-gaseous material removed therewith from the gas, said hot-drain decanter tank having draw-off means for separate off-take of sludge from the sloping bottom and aqueous liquor and tar above the sloping bottom of the decanter tank, means for introducing steam into material contained within the sloping bottom of the decanter tank, storage means adjacent to said hot drain tank and provided with means for heating material contained therein, a charging tank mounted for movement in unison with the coal charging movable means and having means for charging sludge from the charging tank into the gas-producing means, a reservoir provided with heating means for sludge from the storage means and adapted for charging the sludge into the charging tank, regulable means for controlling the flow of sludge from the sludge draw-off means to the storage means, and pumping means adapted to deliver mobile sludge from the storage means to the reservoir.

4. The combination with a settling tank having draw-off means for separately withdrawing sludge from the bottom and lighter constituents from above the bottom of the settling tank, of coal carbonization gas-producing means, means movable from position to receive a coal charge into position to charge the gas-producing means with coal for carbonization therein, a sludge charging tank mounted for movement in unison with the coal charging means for charging sludge into the gas-producing means during coal charging by the coal charging means, a reservoir for sludge from said settling tank mounted in position to charge sludge into the sludge charging tank when the coal charging means is moved from its position for charging the gas-producing means to reloading position, means for heating sludge contained on the bottom of the settling tank to render the same mobile, and means for conveying mobile sludge from the bottom draw off means therefor to said reservoir for sludge.

5. The combination with a hot-drain settling tank for hot coal-gas treatment apparatus and having draw-off means for separately drawing off sludge from the bottom and aqueous liquor from above the bottom of the tank, and a gas collecting main adapted for communication with and for collecting and initially cooling with flushing liquor hot coal gas as it issues from coal carbonization gas-producing means and communicating with the hot-drain settling tank for feeding spent flushing liquor and constituents the latter may have removed from the hot gas to the hot-drain settling tank for separation therein by differences in specific gravities, of coal carbonization gas-producing means, coal charging means movable from position to receive coal charge into position to charge the gas producing means with coal for carbonization therein, a sludge charging tank mounted for movement in unison with the coal charging means for charging sludge into the gas-producing means during coal charging by the coal charging means, a reservoir for sludge from said settling tank mounted in position to charge sludge into the sludge charging tank when the coal charging means is moved from its position for charging the gas-producing means to reloading position, means for heating sludge contained on the bottom of the settling tank to render the same mobile, and means for conveying mobile sludge from the bottom draw-off means therefor to said reservoir for sludge.

ELWOOD W. MONTGOMERY.